A. MACKINTOSH AND F. THOMPSON.
NUT LOCK.
APPLICATION FILED AUG. 9, 1920.
1,382,524.
Patented June 21, 1921.
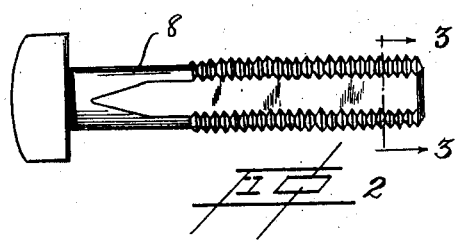
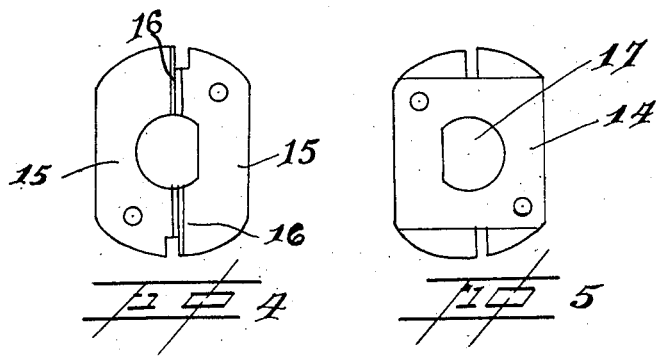
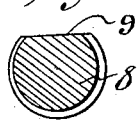
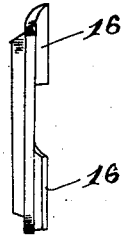
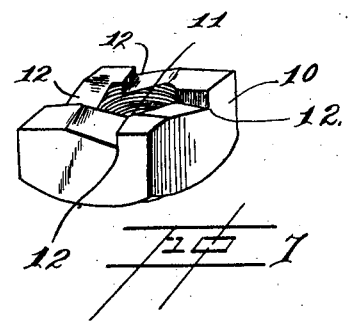
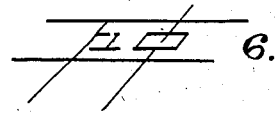
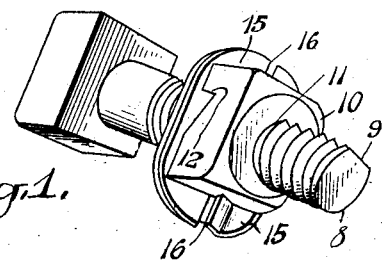
INVENTORS
Allan Mackintosh
Fred Thompson
ATTORNEY
E. H. Hond

UNITED STATES PATENT OFFICE.

ALLAN MACKINTOSH, OF BOWSMAN RIVER, AND FRED THOMPSON, OF SYDNEY MINES, CANADA.

NUT-LOCK.

1,382,524.  Specification of Letters Patent.  Patented June 21, 1921.

Application filed August 9, 1920. Serial No. 402,498.

*To all whom it may concern:*

Be it known that we, ALLAN MACKINTOSH and FRED THOMPSON, citizens of the Dominion of Canada, residents, respectively, of Bowsman River, in the county of Dauphin and Province of Manitoba, and Sydney Mines, in the county of Cape Breton and Province of Nova Scotia, have invented certain new and useful Improvements in Nut-Locks, of which the following is a specification.

This invention relates to improvements in nut locks.

The object of our invention is to provide a bolt having a flattened side to retain a particularly formed washer, which washer is provided with engaging means for retaining a nut against rotation on a threaded portion of the bolt.

A further object is to provide a simple and effective contrivance whereby the nut can be turned in one direction but will be held against turning in the opposite direction unless certain parts of the washer are pressed away from the nut.

A further object is to provide a washer carrying a pair of separate engaging means so that if either one of these are contorted or broken so that it cannot be used further it will not require the expense of another washer with engaging means thereon.

A still further object is to provide a washer having two separate engaging means so that if one becomes broken and by so breaking becomes disengaged from its position of usefulness, the other will still be retained and will keep the nut from turning.

With these and other objects in view, the invention consists in the construction, combination and arrangement of parts as will be hereinafter fully described, illustrated in the accompanying drawings, and pointed out in the claims hereunto appended.

Figure 1 illustrates a perspective view of our invention.

Fig. 2 is a side plan view of the bolt portion of our invention.

Fig. 3 is a sectional view on the line 3—3 of Fig. 2.

Fig. 4 is a front plan view of the washer and engaging means.

Fig. 5 is a rear plan view of washer and engaging means,

Fig. 6 is a side view of the washer and engaging means, and

Fig. 7 is a perspective view of the nut as cut for use in our invention.

Referring to the drawing like numerals designate like parts in the various drawings.

8 indicate a bolt of the ordinary type having a body portion with an enlarged head at one end. The body portion is threaded from the other end inwardly the desired distance. One side of the body portion is cut as at 9 leaving this side of the bolt perfectly flat.

10 is a nut having the usual interiorly threaded opening 11 adapted to be threaded onto the threaded body portion of the bolt 8. The inner side of the bolt is provided with oppositely positioned notches 12, the purpose of which will hereinafter be mentioned.

14 is a washer having an opening corresponding to the outer circumference of the threaded portion of the bolt 8 so that this can be slidably positioned thereon.

This washer is provided with two engaging members 15 preferably formed from sheet spring metal, and having one end attached to one corner of the washer 14 so that these two engaging members will be attached at opposite corners to each other on the said washer.

The inner side of the respective engaging members 15 at the undetached end are bent away from the washer as indicated in Fig. 6 as at 16. It is to be understood that the inner adjacent ends of the members 15 are upturned, as seen in Fig. 4, to prevent the nut being turned backward so that the members 15 could be swung on their pivots.

After the bolt 8 has been passed through material in which it is to be used, the threaded end will extend outwardly therefrom. The washer 15 is slidably positioned over this end and on account of its comparative shape to the outward circumference of the bolt 8, the flat side of the central opening 17 of the washer engages with the flat side 9 of the bolt so that the washer is not rotatable on the bolt. The nut 10 is then threadedly engaged on the bolt and when tightened up against engaging members 15, the outwardly extending portion 16 will engage in the notches 12 and will not permit the nut to work off the bolt.

If desirous of removing the nut the outwardly extending portion 16 can be held down by pincers or any other way, while the nut is being turned off the bolt.

From the foregoing it is thought that the construction of our invention will be clearly understood, and, therefore, a more extended explanation has been omitted.

What we claim as new is:

1. In combination with a bolt having its side flattened, of a washer having an opening corresponding to the outer circumference of said bolt, engaging means carried by said washer in such a position that the free ends of said engaging means may have their inner sides bent outwardly, a nut having notches cut in the inner side of same and adapted to be threaded onto said bolt and said notches adapted to receive the inner outwardly bent sides of said engaging members, said washer having an upper plain surface and both ends of said engaging means being turned up.

2. A bolt having a flattened side, a washer having an opening corresponding to the cross section of the bolt, the said washer having resilient engaging members pivoted at opposite corners with the inner sides of the said members at the undetached end bent at an angle to the plane of the body of the washer, and a nut having notches upon its face in which said bent ends engage, said washer having an upper plain surface and both ends of said engaging member being turned up.

In testimony whereof we affix our signatures in the presence of witnesses.

ALLAN MACKINTOSH.

Witnesses:
S. A. GARDINE,
C. R. SMITH.

FRED THOMPSON.

Witnesses:
ALEX VICKERS,
WILLIAM FERGUSON VICKERS.